March 31, 1936.　　J. W. MacCLATCHIE　　2,035,818
PLUG VALVE
Filed May 7, 1934

INVENTOR.
JOHN W. MACCLATCHIE
BY R. W. Smith
ATTORNEY.

Patented Mar. 31, 1936

2,035,818

UNITED STATES PATENT OFFICE 2,035,818

PLUG VALVE

John W. MacClatchie, Los Angeles, Calif., assignor to MacClatchie Manufacturing Company, Compton, Calif., a corporation of California Application May 7, 1934, Serial No. 725,528

3 Claims. (Cl. 251—97)

This invention is a plug valve, and has for its object to seat and retain a valve plug in operative assembly relative to a valve casing and to positively disengage the plug in the event of it becoming stuck.

It is a further object of the invention to arrange the retaining means as a closure means for the valve casing, and to prevent leakage at said closure means, both when the closure means has seated the plug and when it has released the plug from its seating engagement.

It is a still further object of the invention to provide extremely simple but efficient means for insuring anti-frictional engagement between the rotatable plug and the stationary closure means.

Further objects of the invention will be readily understood from the following description of the accompanying drawing, in which.

Figure 1:
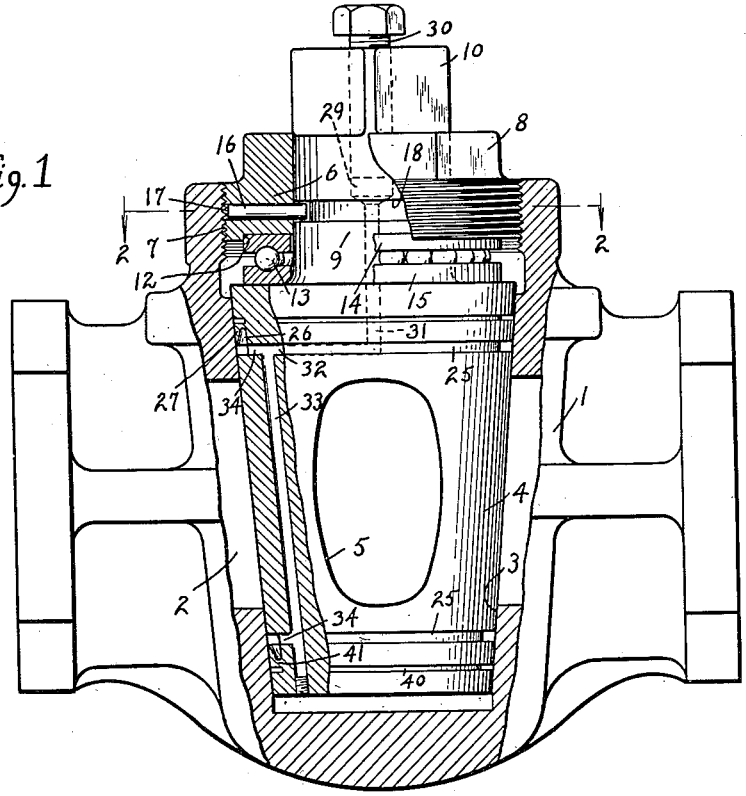
Fig. 1 is a side elevation of the invention, partly broken away in axial section.
Figure 2:
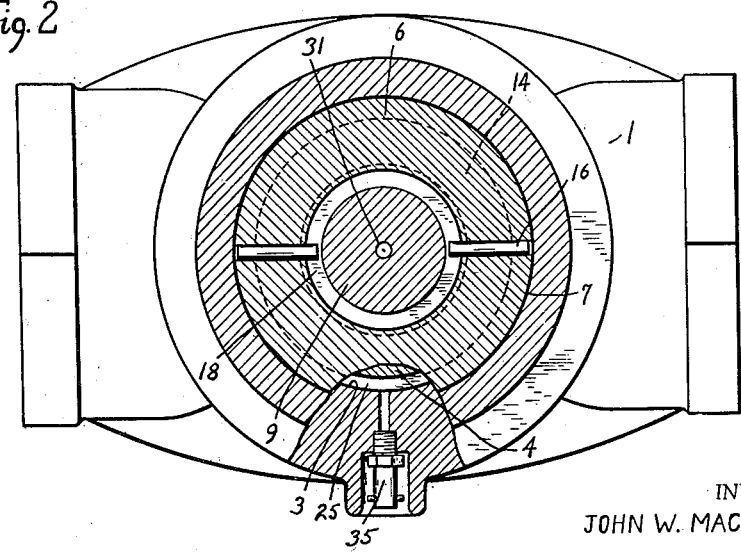
Fig. 2 is a transverse section on the line 2—2 of Fig. 1.

The invention is applicable to any usual plug valve construction, illustrated as comprising a valve casing 1 having fluid passageway 2 and transverse bore 3, with a valve plug 4 rotatable in bore 3 and having a transverse port 5 adapted for alinement or non-alinement with passageway 2 when the plug is turned. The peripheral surfaces of plug 4 and bore 3 cooperate to define a seating surface for the plug.

A means cooperates with casing 1 for retaining the plug in operative assembly or positively disengaging the plug in the event of it becoming stuck; and in the present instance this means is shown as a cap 6 adapted to be screwed into a threaded end 7 of the transverse bore 3 and having a head 8 adapted for engagement by a suitable tool. The opposite end of the transverse bore 3 is closed by the body of the valve casing. The plug 4 is provided with means for rotating the plug, which may comprise a stem 9 integral with the plug and projecting through the closure cap 6 and having a head 10 adapted for engagement by a suitable tool.

An engagement is provided between cap 6 and valve plug 4 so that when the cap is screwed into bore 7 it positions and retains the plug in operative assembly relative to the cooperating bearing surface of bore 3; and an engagement is provided between cap 6 and plug 4 so that when the cap is unscrewed from the bore 7 it positively withdraws the plug from its operative assembly relative to the bearing surface of bore 3.

For this purpose the cap 6 is counterbored at its inner end as shown at 12, and a ball race surrounds valve stem 9 and is positioned between counterbore 12 and the end of valve plug 4, the ball race being shown as comprising balls 13 journaled between abutment rings 14—15. An anti-frictional bearing is thus provided between cap 6 and plug 4 when the cap has been screwed into the bore 7 for seating the valve plug relative to the bearing surface of bore 3, and the valve plug may then be freely turned relative to the stationary cap 6 for opening or closing the valve. The engagement between the valve plug and the closure cap whereby the plug may be positively withdrawn from the valve casing, is shown as comprising pins 16 inserted in radial bores 17 in the cap 6, and projecting into an annular groove 18 in the stem 9.

In assembling the parts, the valve plug being withdrawn from casing 1, the ball race 13—14—15 is mounted on plug 4 and cap 6 is mounted on abutment ring 14 and the pins 16 are inserted in bores 17 so as to seat in groove 18 and clear the threads at the outer periphery of cap 6. The cap is then screwed into bore 7, the pins 16 moving freely around the groove 18, and the threaded engagement of the cap axially shifts the valve plug until it is properly seated in its cooperating bore 3. The valve is then ready for use, the stem 9 being rotated to open or close the valve by alining or non-alining port 5 with the passageway 2. If the valve plug becomes stuck so that it cannot be turned, the cap 6 is unscrewed so that the engagement of pins 16 with the wall of groove 18 positively axially shifts the valve plug for releasing its binding engagement in the bore 3.

By way of illustration the valve plug is shown as a tapered plug seating in a correspondingly tapered bore, and in this particular embodiment of the invention the cap 6 is preferably screwed down until the tapered plug is just free of wedging engagement in its tapered bore 3, so that the plug is normally free to turn to open or closed position. If the plug becomes stuck as a result of corrosion or collection of a film of foreign material at the seating surface of the valve, unscrewing the cap 6 so as to axially shift the tapered plug in the opposite direction to that of its taper, enlarges the space between the bearing surfaces of the plug and bore so as to release the binding engagement which has been causing the valve to stick.

By way of illustration the valve is shown provided with means for preventing leakage at its seating surface, said means being of the type shown and described in my copending application Ser. No. 725,527, filed May 7, 1934.

As an instance of this arrangement annular grooves 25 are provided at the seating surface of the valve, and these annular grooves are preferably spaced longitudinally of the valve plug at opposite sides of its transverse port 5, and in the present instance are formed in the bearing surface of the valve plug rather than in the cooperating bearing surface of bore 3. That wall of each groove which is remote from the transverse port 5, is undercut as shown at 26, forming a tapering lip 27 at the bearing surface of the plug and terminating at the side of groove 25 which is remote from the transverse port 5. Pressure is exerted against the lips 27 for expanding the same so as to seal the seating surface between the plug and its bore, and by the construction described this sealing engagement extends completely around the annular seating surface of the valve, and a plurality of such annular seals are provided, spaced longitudinally of the plug 4 at opposite sides of its transverse port 5. The seals thus prevent leakage from passageway 2 along the seating surface of the valve and thence past the ends of the valve plug.

Pressure from passageway 2 and along the seating surface of the valve will tend to expand the sealing lips 27, but additional means are preferably provided for insuring a high pressure for expanding the sealing lips. For this purpose a fluid under pressure may be supplied to grooves 25, preferably in the form of a lubricant. The lubricant may be contained in a reservoir 29 which is preferably formed in the valve stem 9, and a pressure screw 30 may be threaded into the reservoir for exerting a high pressure on the lubricant and forcing it into the grooves 25. For this purpose the reservoir may communicate with an axial bore 31 in the valve plug, with said bore connected to a radial bore 32 which in turn communicates with a longitudinal bore 33 in the valve plug. The longitudinal bore communicates via radial bores 34 with the respective grooves 25.

Lubricant may be supplied to reservoir 29 through a usual check-valve coupling or fitting 35 which is adapted for detachable engagement by a usual lubricant supply means (not shown), the fitting 35 being shown as positioned at the side of casing 1 and communicating with one of the grooves 25. The pressure screw 30 having been turned so as to retract it from reservoir 29, lubricant is supplied to the reservoir via fitting 35 and the connecting bores, and the pressure screw is then turned so as to project it into the reservoir as shown at Fig. 1, thereby forcing the lubricant into the grooves 25 under high pressure.

To insure flexing of the lips 27 responsive to pressure, so as to expand the same to provide a tight seal at the seating surface of the valve, the lips may be weakened at the base of the lips. For this purpose annular grooves 40 may be formed in the bearing surface of plug 4, in back of the lips longitudinally of the valve plug, so that the base of the lips are of restricted width as shown at 41.

The invention as thus described provides an extreme simple assembly, whereby a valve plug may be seated relative to the bearing surface of its cooperating bore and may be positively released in the event of its becoming stuck, simply by screwing a closure cap into or out of a cooperating bore of the valve casing, with anti-frictional means provided between the valve plug and the closure cap for insuring free turning of the valve.

The transverse port 5 of the valve plug is preferably arranged for maximum cross-sectional area consistent with required thickness of the encompassing wall of the plug; and for this purpose the cross-section of port 5 is elongated and preferably tapers in the direction of the tapering length of plug 4, so as to produce additional cross-sectional area of the port while maintaining adequate thickness of the encompassing wall of the plug at the sides of the elongated port, and to insure maximum strength of the encompassing wall of the plug the elongated cross-section of the port 5 is curvilinear throughout its periphery, i. e., it is an oval as distinguished from merely an oblong having tapering straight sides and curved ends.

I claim:

1. In a plug valve, a valve casing having a bore for a valve plug, a valve plug rotatable in the bore, a valve stem projecting outwardly through the bore, a cap mounted on the stem and received in the bore, means for adjusting the cap longitudinally of the bore, the stem having an annular recess, the cap having a radial bore, and a pin adapted for projection through the radial bore and into the annular recess before the cap and valve plug are mounted in the casing, the pin being held against radial displacement from the cap by reception of the cap within the bore of the casing.

2. In a plug valve, a valve casing having a bore for a valve plug, a valve plug rotatable in the bore, a valve stem projecting outwardly through the bore, a cap mounted on the stem and received in the bore, means for adjusting the cap longitudinally of the bore, an overhanging abutment on the stem, the cap having a radial bore, and a pin adapted for projection through the radial bore before the cap and valve plug are mounted in the casing, with the inner end of the pin underlying the overhanging abutment, and the pin being held against radial displacement from the cap by reception of the cap within the bore of the casing.

3. In a plug valve, a valve casing having a bore for a valve plug, a valve plug rotatable in the bore, the bore of the casing projecting beyond the plug and being threaded, a valve stem projecting outwardly through the threaded end of the bore, a cap journaled on the stem and adapted for threaded reception in the threaded end of the bore, the stem having an annular recess, the cap having a radial bore, and a pin adapted for projection through the radial bore and into the annular recess before the cap is screwed into the threaded end of the bore, the pin being held against radial displacement from the cap by threaded reception of the cap within the threaded end of the bore.

JOHN W. MacCLATCHIE.